Figure 1:
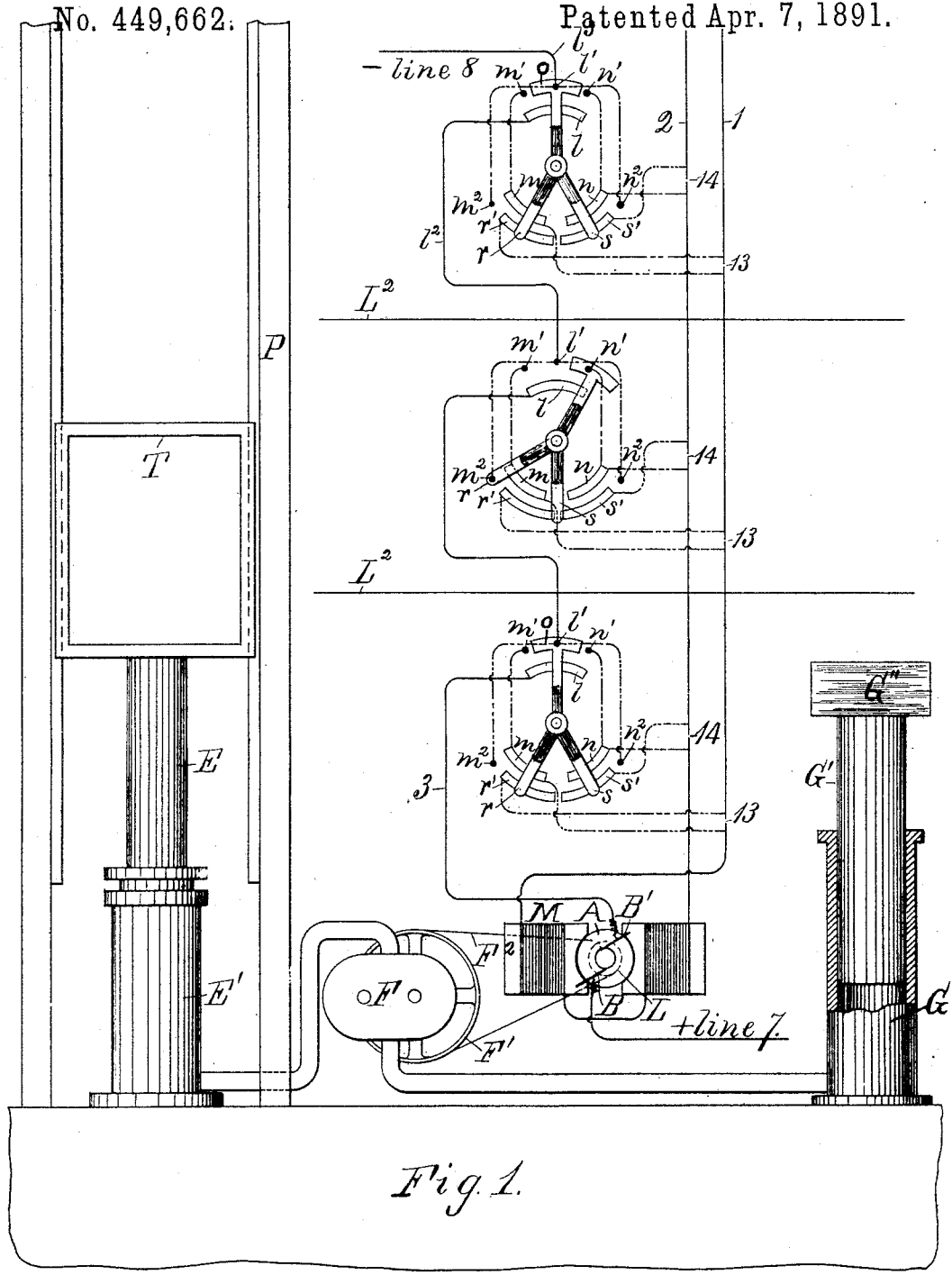

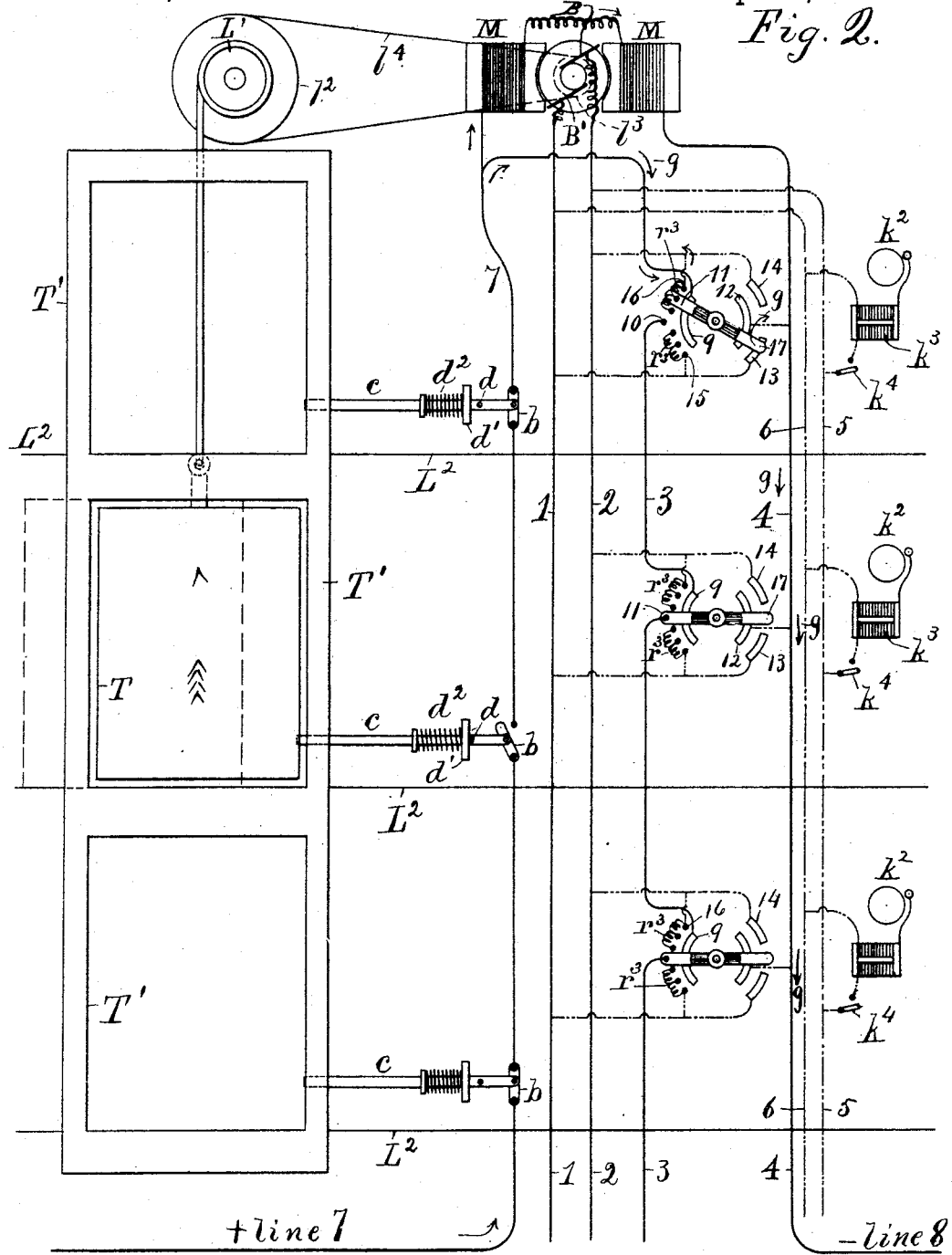

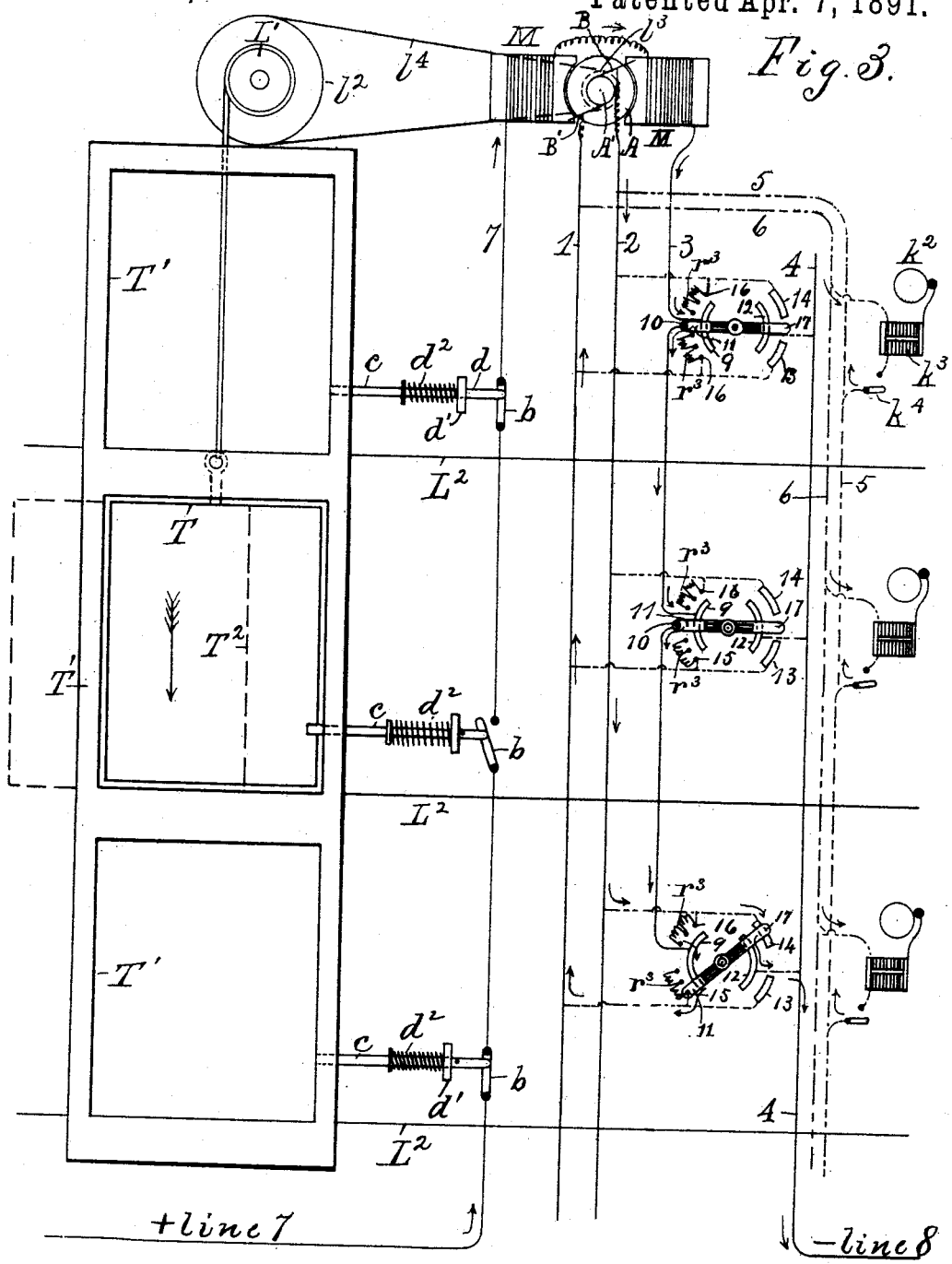

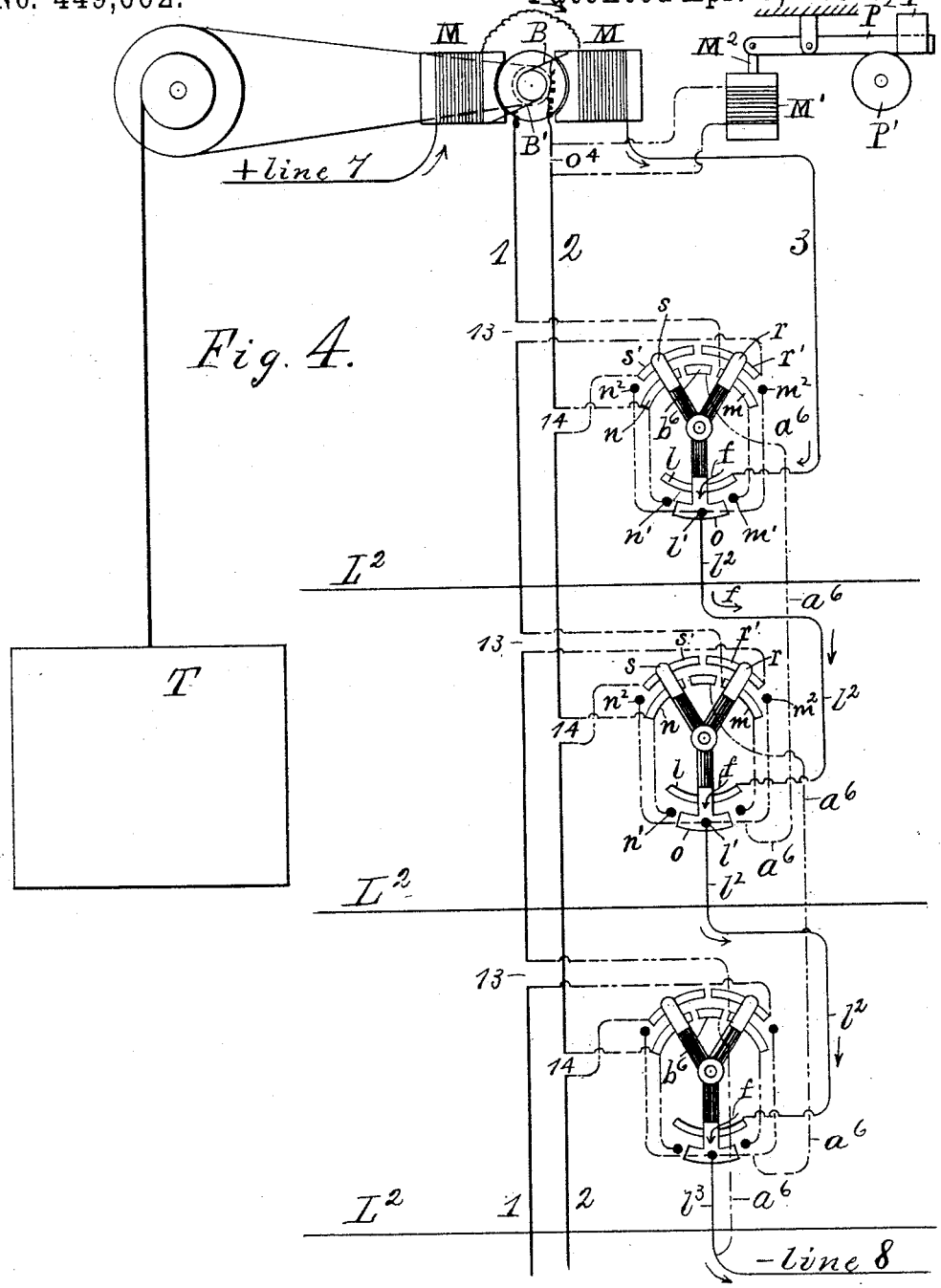

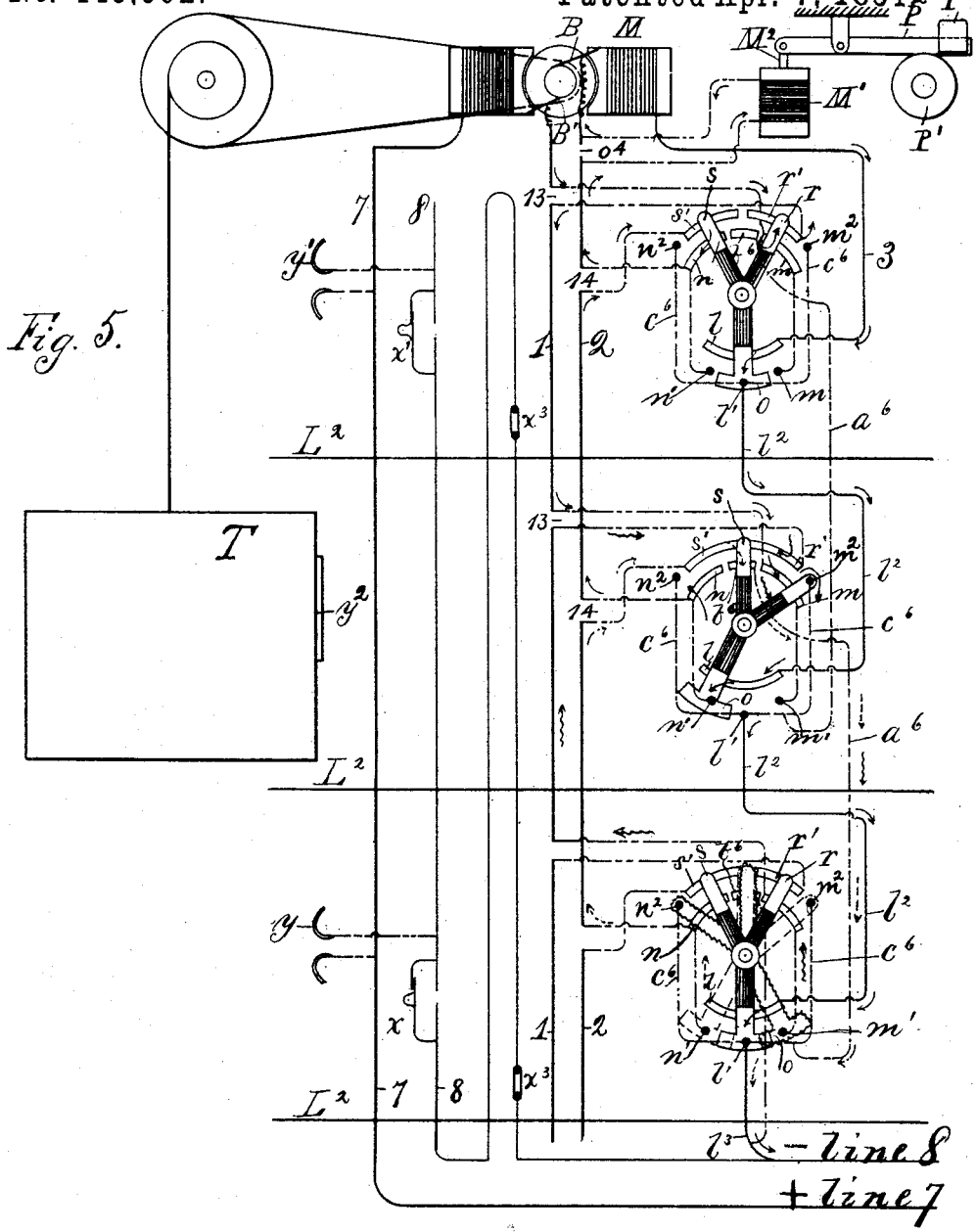

United States Patent Office.

WILLIAM BAXTER, JR., OF BALTIMORE COUNTY, ASSIGNOR TO THE BAXTER ELECTRIC MOTOR COMPANY, OF BALTIMORE, MARYLAND.

SYSTEM OF OPERATING ELECTRIC ELEVATORS WITH LANDING-SWITCHES ONLY.

SPECIFICATION forming part of Letters Patent No. 449,662, dated April 7, 1891.

Application filed April 20, 1888. Renewed October 31, 1890. Serial No. 369,876. (No model.)

*To all whom it may concern:*

Be it known that I, WILLIAM BAXTER, Jr., a citizen of the United States, residing in the ninth election district of the county of Baltimore and State of Maryland, have invented certain new and useful Improvements in a System of Operating Electric Elevators with Landing-Switches Only, fully described and represented in the following specification and the accompanying drawings, forming a part of the same.

The object of this invention is to provide a means for controlling the movement of a platform or car arranged to move in a hoistway; and the invention consists in a system of electrical circuits and switches adapted by varying the course of the electric current in the circuits to vary the movement of the hoisting mechanism in the desired manner from the landings only.

The invention is particularly applicable to hoisting mechanism actuated by an electric motor.

In my patent application, Serial No. 267,524, filed March 17, 1888, I have made claim to a system of circuits and switches for regulating the hoisting mechanism from the moving car and for landing-switches operating in conjunction with a car-switch; but my present construction is restricted to the use of switches arranged at landings or fixed points only, and is thereby adapted to control the movements of a car or platform carrying no operator, as a dumb-waiter or a freight-hoisting platform. It is therefore provided with means for indicating to an operator at any one of the series of switches whether any other switch in the series has been turned from its normal position, the indicator showing if the car or platform is already in motion, and with automatic stop-switches for arresting the movement of the car at the limit of its travel.

Certain parts of my invention are also limited to the use of a regulated current generated by a dynamo-electric machine, the switches being formed with contacts that are joined during the movement of the switch-arm from one contact to another, so that the system may be used with a current of constant potential, or the switches being provided with a series of resistances that are cut out as the switch-lever closes the circuit through the electric apparatus and the system thus adapted to operate with a current of constant potential. By adapting the switches to operate with a regulated current my system for operating elevators may be placed in the circuits now largely used for the distribution of light and power, in which circuits the current is generated by a dynamo-electric machine at a central station, and the various electrical apparatus which are operated from such a central station are arranged in series in the circuit if the current be regulated to possess constant strength, or in multiple arc if the current be regulated to possess constant potential.

My invention will be understood by reference to the annexed drawings, in which—

Figure 1 is a diagram showing a car moved by a hydraulic hoister, the switches being adapted to a constant potential in the electric circuit. Fig. 2 is a diagram showing a car actuated by an electric motor with three switches adapted to operate with constant potential in the circuits and the switch nearest the motor turned to run the car up. Fig. 3 is a similar diagram with the lower switch turned to bring the car down. Fig. 4 is a diagram showing the car actuated by an electric motor and three switches adapted for constant current in the circuit; and Fig. 5 shows a diagram the same as Fig. 4, with certain of the switches turned to indicate their operation.

Where an electric motor is used to actuate the hoisting mechanism, the motor may be compound or shunt wound or wound in series or otherwise, and the variations effected in the circuit by the switches may be restricted to the armature-circuit or the field-circuit, if preferred.

In Fig. 1, showing a series-wound motor adapted to operate with constant potential in the circuit, the hoistway is indicated merely by two parallel beams P, with a car T arranged between them and actuated by a hydraulic plunger E, fitted to a hydraulic cylinder E'. The magnet-coils of an electric motor are indicated at M and the armature at A, and a rotary pump F is shown connected by a pulley F′ and belt F² with a pulley L upon the shaft of the armature A. An accumulator G, provided with weighted plunger G′, is connected with the suction of the pump, and its outlet is connected with the bottom of the elevator-cylinder E′, so that the rotation of the motor and pump in one direction will draw the fluid from the accumulator and force it into the elevator-cylinder to hoist the car T, while the reversal of the motor and the consequent rotation of the pump in the opposite direction will withdraw the fluid from the hydraulic cylinder and restore it to the accumulator. The weight G″ upon the plunger G′ of the accumulator may serve to balance the piston of the elevator-cylinder E′ and the car with part of its load.

The commutator-brushes are shown at B B′, and wires or conductors 1 2 3 are shown arranged parallel with the hoistway and provided with connections to a series of switches arranged upon the different hoistway-landings L². It is obvious that such electrical wires may be carried to any location and the connections effected with the same facility; but their arrangement by the side of the hoistway is most convenient for illustrating the electrical connections and the operation of the circuits in the drawings.

The conductors 1 and 2 are connected, respectively, with the terminals of the field-coils, the conductor 3 with the commutator-brush B′, and the wire $l^3$, which is attached to the contact $l'$ in the last switch of the series, with the − line-wire, while the + line-wire is connected with the other brush B. With such connections the current enters the armature-circuit at B and emerges at B′, and the switches operate to transmit the current from the conductor 3 or its connection $l^2$ into either the conductor 1 or 2 at pleasure, the opposite conductor 2 or 1 being simultaneously connected with the conductor $l^3$ and − line-wire 8 to complete the circuit to the generator. The switch-lever is formed with three arms, each having a spring adapted to press upon a contact-segment and upon other contacts adjacent thereto. The three springs are wholly insulated from one another upon the arms of the switch-lever and are lettered, respectively, $r$, which is normally in electrical connection with conductor 1; $s$, which is normally in electrical connection with conductor 2, and $o$, which is normally in electrical connection with conductor 3. Each spring thus serves to connect any contact to which it may be moved with its respective conductor.

Adjacent to the segment $l$ in each switch is a contact $l'$, connected when the switch-lever is in its normal position with the segment $l$ of the switch next in series, excepting that the contact $l'$ in the last switch is connected with the − line 8 by means of the wire $l^3$. The conductors 1 and 2 are broken at each switch and provided with loops and with contacts which serve when the switches are in their normal position to close such conductor through all the switches.

The conductor 1 is connected in each switch with contacts $m$ and $m'$ below the break 13 and with the contact $r'$ above such break, and the conductor 2 is connected in each switch with contacts $n$ and $n'$ below the break 14 and with a contact $s'$ above such break. The contacts $m$ and $n$ are adjacent to the contacts $r'$ and $s'$, and are adapted to be connected therewith by the springs $r$ and $s$ of the switch-lever, and the contacts $m'$ and $n'$ are adjacent to the segment $l$, and are adapted like the contact $l'$ to be connected therewith by the spring $o$. Contact-studs $m^2$ and $n^2$ are also arranged adjacent to the segments $r'$ and $s'$ and connected with the contact $l'$.

When the switch-levers are all in their normal position, the spring $r$ serves to close the conductor 1 through all the segmental contacts $m$ and $r'$, and the spring $s$ operates to close the conductor 2 through all the segmental contacts $m$ and $s'$.

The current when the motor is at rest and the switch-levers are all in their normal position, as shown in Fig. 4, passes through the field-coils and reaches the − line 8 by the wire 3, contacts $l$ and $l'$, springs $o$, and wires $l^2$ and $l^3$.

In Fig. 1 the middle switch is shown turned to the right, and the current through the field-coils, which passes through the contacts $l$ and $l'$ in the first switch, enters the contact $l$ in the second switch, and is directed by the shifted spring $o$ into the contact $n'$, from which it passes by contact $n$ to the conductor 2. The current then passes around the break 14 at the first switch through the spring $s$ and enters the field-coils M by conductor 2. From the field-coils the current passes around the break 13 in conductor 1 through the spring $r$ in the first switch, and is then led by the shifted spring $r$ in the second switch from the contact $m^2$ to the contact $l'$ in the same switch, whence it passes through the spring $o$ in the switch beyond it and wire $l^3$ to the − line 8. The current in such case would rotate the armature and pump in a certain direction—as, for instance, to pump the water into the hydraulic cylinder E′.

The turning of any of the switches in the opposite direction—that is, to the left—operates to throw the current from conductor 3 into conductor 1, and the current then passes into the field-coils M in the opposite direction and from the field-coils M′ into the − line 8.

With the above construction it is obvious that the movement of the car may be readily controlled from any landing, the levers being turned to the right or left, as required, to cause the car to move up or down in the hoistway, and the operator may therefore move the car from any stationary position to his own landing by observing whether the car is above or below the same and turning the switch in the proper direction.

As it is common to connect a number of electrical devices, as lamps or motors, or both, in series in a single circuit when the circuit is operated with constant current, it is necessary to avoid an open circuit in any of the switches, whether in their normal position or moved to the right or left. The contact-studs $n^2$ and $m^2$ are therefore placed sufficiently near to the segments $r'$ and $s'$ for the arms $r$ and $s$ to touch such studs before they are moved from the segments, and the contact spring or leaf $o$ is made long enough to reach from the contact $l'$ to either of the adjacent contacts before moving from such middle contact.

It will be found by an examination of the drawings that the switch nearest the motor or the one first receiving the current from the positive conductor would control the movements of the car, and the movement of any such switch would neutralize the operation of a switch at any other landing if turned at the same time.

An electrically-operated indicator may be placed by each switch to inform the operator in advance whether the car is in motion from the turning of some other switch, and thus warning him not to move the switch, as it would result in opening the circuit. Indicator-bells $k^2$ are shown in Fig. 3, the magnet-coils $k^3$ being shown connected by a switch or push-button $k^4$ with circuit-wires 5 and 6. Such wires are electrically connected with the brushes B and B' of the commutator, (through the conductors 1 and 2,) and, owing to the increase in the electro-motive force of the armature when in motion, a branch circuit of sufficient intensity to actuate the hammer of the indicator-bell is established in the wires 5 and 6 when any of the switches $k^4$ is closed and the armature rotating. The operation of the bell or of any magnetically-operated indicator in such branch circuit would therefore show to the operator that the motor was in operation and that it would be improper to turn the adjacent switch.

Figs. 2 and 3 show constructions in which the car is suspended from a drum L' and the drum is actuated by a pulley $l^2$, connected with a pulley $l^3$ upon the motor-armature shaft by a belt $l^4$. The motor-coils are indicated at M M', the armature at A, and the armature-shaft at A', and the motor is represented as shunt wound, with the conductors 1 and 2 connected to the armature-brushes, the conductor 3 to a branch of the + line-wire 7, and the conductor 4 to the − line-wire 8. The shunt-circuit through the magnet-coils extends directly from the + line to the − line and is always closed. In this construction the resistance in the circuit when the motor is standing still is equal to that of the magnet-coils, which, being greater than that of the armature, is more wasteful in its relation to the electric current than the resistance of the armature when at rest, which is the only resistance in the circuit when the connections are arranged as shown in Fig. 1, although applicable only to constant current in the circuits. The circuit-connections to the motor shown in Fig. 1 are therefore best adapted for constant-current circuits in situations where the hoister is used but little, and the resistance when it is at rest is the chief expense for the electric current.

The motor in Fig. 2 is shown shunt wound and in Fig. 3 series wound with connections adapted for constant potential in the circuit, and the conductors connected with the brushes being figured 1 and 2, the + conductor receiving the current directly or indirectly from the + line-wire 7 being numbered 3, and the − conductor connected with the − line-wire 8 being numbered 4. Each switch is placed in a loop of the + conductor 3, the ends of such loop terminating in fixed contacts 9 and 10, and the switch-lever is formed with two arms, one of which, provided with contact plate or spring 11, is adapted normally, as shown in the two lower switches in Fig. 2 and the two upper switches in Fig. 3, to connect such contacts and close the circuit through the loop to lead the current to the succeeding switch of the series. A segment 12, like the contact 9, is connected with conductor 4, and segments 13 and 14, adjacent to the same, are connected with the conductors 1 and 2. Studs 15 and 16 are also arranged adjacent to the contact-segment 9 and are connected to the conductors 1 and 2, and additional contacts with intermediate resistances $r^3$ are arranged between the contact 10 and the contacts 15 and 16. The spring 11 when moved from the contact 10 in either direction throws the current from the segment 9 into the stud 15 or 16, the intermediate resistances and contacts serving to introduce the current by degrees into the motor through the conductor 1 or 2. A spring 17 upon the other switch-lever arm operates when the arm is moved to connect the conductor 4 through segment 12 with the conductor 1 or 2 through segment 13 or 14. The movement of the switch thus serves simultaneously, as shown by the arrows $g$ in Figs. 2 and 3, to direct the current from the conductor 3 into one of the armature-brushes and to direct the current from the conductor connected with the other armature-brush into the conductor 4 and − line-wire by the intermediate contact 12. The upper switch in Fig. 2 directs the current into the brush B, and, supposing the rotation of the motor thus produced would operate to elevate the car T, then the turning of any of the switches in the opposite direction, as in Fig. 3, would serve to throw the current into the brush B' and to reverse the motor to lower the car.

In Figs. 2 and 3 a door-frame T' is shown at each landing, with the car T represented as a hollow box within the frame upon the middle landing, and the wires 5 and 6 for the indicator-circuit are shown at the right hand of the conductors 1, 2, 3, and 4. A door $T^2$ is shown in Fig. 3 in dotted lines (in front of such car) partially opened, and the same door is assumed to be closed in the door-frames at the other two landings of the same figure. Switches $b$ are inserted in the conductor 7 and are opened, each, when the landing-door is opened, by a push-rod $c$, extended from an arm of the switch through the door-frame T'. A stop-pin $d$ is inserted in each push-rod adjacent to a bearing $d'$, and a spring $d^2$ operates to hold the stop normally against the bearing and to hold the switches normally closed. The closing of the door operates by moving the push-rod against the resistance of the spring $d^2$ to close the switch $b$, and such closed switches thus maintain when all the doors are closed the continuity of the conductor 7, and thus preserve the circuit unbroken. The opening of any door, as that shown in dotted lines $T^2$ at the middle landing in Figs. 2 and 3, permits the spring $d^2$ to act and the switch $b$ to be turned, thus breaking the circuit and preventing the operation of the motor until the door be closed. Such a construction necessitates the closing of the door by the operator at any landing before the car can be started from such landing, the closed door thus giving warning to other parties that the car has been moved from such landing and that the door should not be again opened until the car is returned.

In the construction shown in Fig. 1 the turning of two switches at the same time would operate to break the circuit, as the current when more than one switch at a time is turned is unable to find a continuous connection to the conductor $l^3$. Such an open circuit would do no harm when a current of constant potential was used; but where a current of constant strength is used, as with the construction shown in Fig. 1, an open circuit would interfere with any other mechanism arranged in the same circuit, and such switch-connections could only be utilized by carefully using the indicators shown in Figs. 2 and 3. In Figs. 4 and 5, however, is shown a system in which the switches are provided each with an additional contact adapted to carry the current from the motor-circuit to the line 8 independently of the series connection extending between the series of switches when in their normal position. In these figures the motor is shown series wound and the circuit adapted for constant current, and a brake adapted to check the movements of the motor when the circuit through the same is broken is indicated in a brake-wheel P', which would in practice be connected with the hoisting devices. $P^2$ is a lever pressed normally upon the brake-wheel by a weight $P^3$. M' is a solenoid, with core $M^2$ attached to the lever $P^2$, and operating when the coils of the solenoid are energized to lift the weighted lever from the brake-wheel. The solenoid-coils are connected by suitable wires with the conductor 2, closing a circuit around a break $o^4$ in such conductor, and the brake-magnet is therefore energized whenever the current passes through the conductor in actuating the motor and hoisting mechanism. The stoppage of the motor by opening the armature-circuit operates automatically to destroy the attraction of the brake-magnet and permits the brake-lever to press upon the brake-wheel and hold the hoisting mechanism and car stationary, as desired.

In my application, Serial No. 267,524, I have shown a brake thus operated, and do not therefore claim the same generically herein, but have restricted my claim to the combination of such a brake with a series of landing-switches only. The switches in Figs. 4 and 5 operate, with the exception of the additional contact just referred to above, the same as the switches shown in Fig. 1, with the circuits adapted for constant current. The conductors 1 and 2 are connected with the commutator-brushes B B'. The line-wire 7 is connected with one terminal of the field-coils, and the current from the other terminal of the field-coils passes through conductor 3 to the segmental contact $l$ in the switch nearest the motor. In Fig. 5 the switch-lever in the lowest switch—that is, the one farthest from the motor which connects the circuit with the − line 8—is shown in full lines in its normal position, in dotted lines turned to the right like the middle switch, and in wavy lines turned to the left. As the last contact $l'$ connects the circuit with the − line 8, it follows that when the lower switch is turned at the same time as any other switch in the series it cuts off the connection of the segment $l$ with such contact, and the current reaching such segment in the lowest switch would not therefore reach the − line 8 without an additional connection. When the spring $o$ in the lower switch is shifted, it connects the contact $l$, which receives the current from the upper switches, with one of the adjacent contacts $m'$ or $n'$, which are united electrically with the segments $m$ and $n$. These segments are connected, respectively, with the conductors 1 and 2, so that a current passing therefrom may traverse either of such conductors to the segment $r'$ or $s'$ in the switch above, and an auxiliary contact is provided near the adjacent ends of such segments to receive the current therefrom and conduct it to the wire $l^3$ when required. Such auxiliary contact $b^6$ is placed in each switch of the series between the segments $m$ and $n$, so that when either of the springs $r$ or $s$ is turned to actuate the motor the other spring $s$ or $r$ falls upon the contact $b^6$ and simultaneously connects the same with the adjacent ends of the segments $r'$ and $s'$, the spring being made wide enough to join such segments. The contact $b^6$ in each switch is connected by a wire $a^6$ with the contact $l'$ in the switch below it, and the current entering such auxiliary contact is thus led to the wire $l^3$ and − line 8 independently of the spring in the lower switch-levers.

The current returned to one of the upper switches by the simultaneous shifting of a switch below it enters such upper switch from the conductor 1 or 2 at the segment $r'$ or $s'$, and passes thence through the spring $s$ (if such spring be upon the contact $b^6$, as shown in the middle switch) to the auxiliary contact, and thus through the wire $a^6$ to the contact $l'$ in the lowest switch, and thence to the − line-wire 8.

The direction of the current in the circuits, with the middle switch turned and the lower switch in its normal position, is shown by the arrows in full lines, and the dotted arrows and wavy arrows indicate, respectively, the course of the circuit to reach the − line 8 when the lower switch, in addition to the middle switch, is turned in the directions shown in dotted or wavy lines.

With switches of the construction just described it is obviously impossible to make an open circuit, and the system thus wholly prevents any derangement of other apparatus (as arc lights or other motors) that may be connected in series with such switches and their motor-circuit. The operation of two switches at the same time would, however, not be able to actuate the car in two opposite directions; but the switch nearest the motor, or, rather, the one first receiving the positive current, would control the circuit through the motor, and would thus control the movements of the hoisting mechanism. This will be understood by inspection of Fig. 5, where it will be seen that the current coming from the first switch is conducted from the segments $l$ and $n$ in the second switch to the commutator-brushes and back again to the segment $m$ in the second switch, from which it passes to the segment $l$ in the last switch of the series before its course is abnormally deflected. After passing through the armature-brushes it is immaterial how the current reaches the − line 8, and the course of the current in its passage through the conductor 2 and auxiliary contact $b^6$ in the middle switch to the lower contact $l'$ by the wire $a^6$ produces therefore no effect upon the control which the second switch has already exercised upon the direction of the current. It would obviously be unnecessary to furnish indicators adjacent to such switches to prevent the production of an open circuit by turning a switch improperly; but such indicators applied to the armature-circuit, as shown in Fig. 2, would show the operator that the car was already in motion by the turning of some other switch, and that it would be improper for him to turn a switch, as it might, if nearer to the motor or + conductor, interfere with the switch previously turned and reverse the movement of the car operated thereby.

If the lower or middle switch were turned to make the car go up and the upper switch were simultaneously turned to make it go down, the upper switch would obviously reverse the motion of the motor and car as it receives the current from the conductor 3 in advance of the other switches, and would control the direction of its movement through the motor, as above described, in reference to the operation of the second switch upon the third. The indicators may therefore be used with advantage in any construction, although they have no necessary connection with the safe working of the circuits.

In Fig. 5 is shown a device for automatically stopping the car at the extreme limits of its travel, by which the car when started would be prevented from striking the top or bottom of the hoistway and doing injury to the apparatus. Such device consists in switches $y$ and $y'$, consisting in contact-springs adapted to be electrically connected by a plate $y^2$ upon the car when the car reaches the desired limits of its travel. The springs in such switches are connected, respectively, with the + and − lines 7 and 8 outside of the motor and landing-switch circuits, and thus serve when connected by the plate upon the car to short-circuit the motor and cut off the current from the entire system of switches. The motor being thus stopped, the movement of the car would be arrested; but it could not with such construction be started again without breaking the short circuit to restore the current to the switch-circuits, which would be effected by opening spring-switches, which could be located at any convenient point for the use of the operator. Such switches would be normally closed, and may be located, as at $x$ and $x'$, adjacent to the switches $y$ and $y'$, or they may be formed, as the switches $x^3$, in a loop of the circuit extended to any point within convenient reach of an operator. In case such automatic stop-switches are used the landing-switch should be properly turned to start the car in the opposite direction before the short circuit is broken and the motor started.

In Fig. 1 herein the current is normally closed in the armature-circuit and its course is varied by the landing-switches in the circuit of the field-coils, whereas Figs. 4 and 5 show the reverse arrangement, the current being normally closed in the circuit of the field-coils and affected by the switches in the armature-coils only.

In Figs. 2 and 3, where a current of constant potential is employed, the current also passes without change of direction through the field-coils, but is reversed in the armature-circuit to produce the desired movements of the armature.

I am aware that a valve has been shifted by an electro-magnetic device for the purpose of opening ports for the passage of fluid under pressure to a hydraulic elevator-cylinder and connected with switches to reverse the operation of such device, but not in a regulated circuit with other electric apparatus. The switches heretofore used with such an electro-magnetic device have not therefore been adapted for a regulated current having either constant strength or constant potential, and the "make and break" switches heretofore used for operating such valve-shifting device could not be used with a regulated current, as they would be certain to produce a short circuit, which is not admissible when a current of constant strength is employed.

My first claim herein is therefore restricted to the use of hoisting apparatus in circuit with other electrical devices in a system for the distribution of light or power in which a regulated current is employed and with which switches are required of different construction from those heretofore used for such a purpose.

I hereby disclaim the combination, with a valve in a hydraulic hoisting apparatus, of an electro-magnetic device connected with switches, the current being supplied merely by a galvanic battery.

I also disclaim my application, Serial No. 267,524, filed March 17, 1888, in which certain parts of my present invention are shown but not claimed, and in which I have made generic claim to certain features which are claimed specifically herein.

It is obvious that where the nature of the current be changed from constant current to constant potential in the circuits the switches would be changed in a corresponding manner to avoid a short circuit in the one case and an open circuit in the other.

It will be understood that when a current of constant potential is used and the circuit is closed through a revolving armature like that shown in the electric motor in Figs. 2 and 3 it is absolutely necessary to provide artificial resistances $r^3$ in the switches, because the resistance of the armature is very much less when standing still than when it is rotating, as it develops a counter electro-motive force in proportion to the speed of rotation. If the circuit were closed by the switch through the armature when stationary, the dynamo-electric machine with which the circuit is connected would develop so great a current as to destroy the insulation and electrical connections. By providing the resistances and connecting them with studs arranged in the path of the moving connector 11 the resistances are all included in the circuit when the current is first thrown into the armature, and may be gradually cut out as the speed of the armature and its electromotive force increases.

It is obviously immaterial whether the electro-magnetic shifting device (to operate merely in producing a movement of some other part, as in Fig. 6) be constructed with an oscillating or rotating armature, as a rotating armature is well known at the present time as a means for producing motion by combination with suitable gearing or mechanism and would be a mere equivalent for the oscillating shifter shown in Fig. 6.

A variety of constructions for the switches has been shown herein; but it is obviously immaterial what form of switch be used, provided the contacts and connections are constructed and arranged to operate as herein set forth. I have, however, in each of the drawings marked the conductor 3, which is represented as transmitting the positive current to the switches, and in like manner the conductors are numbered 1 and 2, respectively, in which the course of the current is varied or reversed to actuate the electro-magnetic device in the desired manner.

The forms of the door-switches $b$ (shown in Figs. 2 and 3) and the stop-switches $y$ and $y'$ (shown in Fig. 5) are wholly immaterial, provided the essential elements of the construction are employed. Thus the switches $b$ and the switches $x^3$ (shown in Fig. 5) may be made of a mere spring pressed against a metallic contact, and the switches $y$ and $y'$ may be formed in a similar manner and the spring pressed upon its opposed contact to close the circuit by the operation of the plate $y^2$ upon the moving car. The plate $y^2$ in such case would operate to produce the contact, although not conveying the electricity from one conductor to the other.

It will be understood that the direction of the arrows shown upon the drawings to indicate the course of the currents are predicated upon the use of the line-wire 7 as a positive conductor; but it is evident that the electric current would find the same continuous connections if passed through the circuits in an opposite direction when the switches are in their operative position, and it is therefore wholly immaterial whether the current be traversed through the circuits in the manner shown in the drawings or in a reverse manner, which would be effected by using the positive line-wire as a negative conductor. In such latter case the motion of the motor would not thereby be reversed, as the magnetism of the field and armature would be similarly effected, and the attraction or repulsion of the parts would be precisely the same with the current operating in either direction.

Having thus set forth my invention, what I claim herein is—

1. The combination, with a suspended car moving in a hoistway, of hoisting mechanism operated by an electric motor, an electric circuit connected normally through the armature of the motor, a series of landings, and a series of landing-switches located thereon and provided with contacts for controlling the course of the current in said circuit, as and for the purpose set forth.

2. The combination, with a suspended car moving in a hoistway, of hoisting mechanism operated by an electric motor, an electric circuit connected normally through the armature of the motor, a series of landings and a series of landing-switches located thereon and provided with contacts connected with said circuit, the series of switches operating normally to stop the said motor and each switch operating when moved in opposite directions to close reverse-circuits through the motor, as and for the purpose set forth.

3. The combination, with a suspended car moving in a hoistway, of hoisting mechanism operated by an electric motor, an electric circuit connected normally through the armature of the motor with a current of constant potential, a series of landings, and a series of landing-switches located thereon and provided with contacts for varying the course of the current in said circuit, the series of switches operating normally to open the circuit through the motor, field-coils, and each switch operating when moved in opposite directions to close reverse-circuits through the motor, as and for the purpose set forth.

4. The combination, with a suspended car moving in a hoistway, of hoisting mechanism actuated by an electric motor, an electric circuit connected normally through the armature of the motor, and a series of landings with landing-switches located in said circuit, the switches being provided with suitable contacts to normally cut off the current from the motor, field-coils, and operating each when moved to close a circuit through the motor field-coils, as and for the purpose set forth.

5. The combination, with a suspended car moving in a hoistway, of hoisting mechanism actuated by an electric motor, an electric circuit connected normally through the armature of the motor, and a series of landings with landing-switches located in said circuit, the switches being provided with suitable contacts to normally cut off the current from the motor field-coils, and operating each when moved in opposite directions to close branch circuits in reverse directions through the motor field-coils, as and for the purpose set forth.

6. The combination, with a suspended car moving in a hoistway, of hoisting mechanism operated by an electric motor, a primary circuit closed through the armature, a branch circuit between one of the commutator-brushes and one terminal of the field-coils and a branch circuit between the other brush and the other terminal of the field-coils, a series of landings, and a series of landing-switches having contacts connected with both of such branch circuits and operating normally to cut off the current from the field-circuit and adapted to reverse the current through the field-coils, as and for the purpose set forth.

7. The combination, with a suspended car moving in a hoistway, of hoisting mechanism operated by an electric motor, a primary circuit-conductor connected with one of the motor-brushes, a series of landings, and a series of landing-switches provided with contacts connected, respectively, with the other armature-brush, the terminals of the field, and with the other primary conductor, the switches being normally connected in series and operating normally to cut off the current from the field-circuit and when moved in opposite directions to reverse the current through such field-circuit, as and for the purpose set forth.

8. The combination, with a suspended car moving in a hoistway, of hoisting mechanism operated by an electric motor, a primary circuit-conductor connected with one of the motor-brushes, a series of landings, and a series of landing-switches provided with contacts connected, respectively, with the other armature-brush, the terminals of the field, and with the other primary conductor, the switches being normally connected in series and operating when thus connected to cut off the current from the motor-field and when moved in opposite directions to reverse the current through such field-circuit, as and for the purpose set forth.

9. In an electric-elevator system, the combination, with a suspended car moving in a hoistway having landings and landing-doors, of hoisting mechanism operated by an electric motor, an electric circuit for operating the motor, and a door-switch arranged in said circuit and operated by the opening of the door to cut off the current from the motor, and to thus stop the same until the door is closed, as and for the purpose set forth.

10. In an electric-elevator system, the combination, with a suspended car moving in a hoistway having landings and landing-doors, of hoisting mechanism operated by an electric motor, an electric circuit for operating the motor, and one or more door-switches arranged and operated by the opening of the door or doors to open the motor-circuit and to thus stop the motor until the door or doors are closed, as and for the purpose set forth.

11. The combination, with a suspended car moving in a hoistway, of hoisting mechanism operated by an electric motor, an electric circuit for operating the motor, landing-switches located upon the landings of the hoistway and connected with said circuit, and a series of door-switches located in branches of such circuit and operated, substantially as described, to stop the car by the opening of any of the said doors, as and for the purpose set forth.

12. In an electric-elevator system in which the motion of an electric motor is transmitted to the car by means of a hoisting-pulley, intermediate mechanism, and a hoisting-rope, the combination, with the motor-circuit, of a brake actuated by an electro-magnet circuit, a brake actuated by an electro-magnet for retarding the hoisting mechanism, and a series of landings and a series of landing-switches connected with the said motor-circuit and provided each with contacts adapted to close the circuit through the brake-magnet, as and for the purpose set forth.

13. In an electric-elevator system in which a car or platform hoisting device is operated by an electric motor, the combination, with the electric motor and the car-platform moved thereby, of an operative electric circuit, stop-switches connected with such circuit and arranged at the top and bottom of such hoistway and provided with contacts adapted when connected to cut off the current from the motor, and a contact-plate upon the car arranged and operated to connect such contacts when contiguous to either of said switches to close the said circuit and cut off the current from the motor, as and for the purpose set forth.

14. In an electric-elevator system in which a car or platform hoisting device is operated by an electric motor, the combination, with the electric motor and the car-platform moved thereby, of an operative electric circuit, stop-switches connected with such circuit and arranged at the top and bottom of such hoistway and provided with contacts adapted when connected to cut off the current from the motor, a contact-plate upon the car to connect the contacts in either of said switches, and an auxiliary switch to temporarily open said circuit when closed by either of the stop-switches, substantially as herein set forth.

15. The combination, with a suspended car moving in a hoistway, of hoisting mechanism operated by an electric motor, an electric circuit for operating the motor, landing-switches located upon the landings of the hoistway and connected with said circuit, and stop-switches arranged at the top and bottom of the hoistway and provided with contacts connected, respectively, with the prime conductors outside of the motor and landing-switch circuits, and a contact-plate upon the car adapted to electrically connect the contacts in either of said switches when contiguous thereto, substantially as herein set forth.

In testimony whereof I have hereunto set my hand in the presence of two subscribing witnesses.

WILLIAM BAXTER, JR.

Witnesses:
W. F. D. CRANE,
THOS. S. CRANE.